United States Patent
Pandey et al.

(10) Patent No.: US 9,143,306 B2
(45) Date of Patent: Sep. 22, 2015

(54) DEVICE AND METHOD FOR ENCODING BITS TO SYMBOLS FOR A COMMUNICATION SYSTEM

(75) Inventors: Sujan Pandey, Eindhoven (NL); Abhijit Kumar Deb, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 480 days.

(21) Appl. No.: 13/272,060

(22) Filed: Oct. 12, 2011

(65) Prior Publication Data

US 2013/0094603 A1    Apr. 18, 2013

(51) Int. Cl.
*H04L 27/00* (2006.01)
*H04B 1/38* (2015.01)
*H04L 5/14* (2006.01)
*H04L 25/49* (2006.01)

(52) U.S. Cl.
CPC .......... *H04L 5/1423* (2013.01); *H04L 25/4908* (2013.01); *H04L 25/4923* (2013.01)

(58) Field of Classification Search
USPC ................. 375/219, 220, 221, 222, 375/240.26–240.28, 285, 284, 295, 296, 375/316; 455/67.13, 67.11, 702, 703, 71, 455/63.1, 91, 114.2, 115.1
See application file for complete search history.

(56) References Cited

U.S. PATENT DOCUMENTS

| | | | |
|---|---|---|---|
| 4,775,984 A | 10/1988 | Jaffre et al. | |
| 5,465,072 A | 11/1995 | Atarodi | |
| 5,525,983 A | 6/1996 | Patel et al. | |
| 5,856,980 A | 1/1999 | Doyle | |
| 6,259,745 B1 | 7/2001 | Chan | |
| 6,724,234 B1 | 4/2004 | Iliasevitch et al. | |
| 6,792,105 B1 | 9/2004 | Moyer | |
| 8,817,670 B2 | 8/2014 | Pandey et al. | |
| 2002/0021236 A1 | 2/2002 | Greig | |
| 2002/0135463 A1 | 9/2002 | Reyes | |
| 2004/0075773 A1* | 4/2004 | Kimura | 348/571 |
| 2006/0210850 A1 | 9/2006 | Abouatallah et al. | |
| 2007/0080587 A1 | 4/2007 | Ruizenaar et al. | |
| 2007/0121946 A1* | 5/2007 | Ito et al. | 380/270 |

(Continued)

FOREIGN PATENT DOCUMENTS

| EP | 1903733 A2 | 5/2007 |
|---|---|---|
| EP | 1 903 733 A2 | 3/2008 |
| EP | 1903733 A2 * | 3/2008 |

OTHER PUBLICATIONS

Jae H. Baek, Ju H. Hong, Myung H. Sunwoo and Kyung U. Kim, "Efficient Digital Baseline Wander Algorithm and Its Architecture for Fast Ethernet," IEEE SIPS 2004, pp. 136-141.

(Continued)

*Primary Examiner* — Linda Wong

(57) ABSTRACT

A device and method for encoding bits to symbols for a communication system are described. In one embodiment, a method for encoding bits to symbols for a communication system includes receiving a set of N-bit data to be transmitted, where N is an integer, generating side scrambling values using a polynomial, scrambling the set of N-bit data using the side scrambling values to produce scrambled data, mapping the scrambled data to a particular set of M symbols from a plurality of sets of M symbols, where M is an integer and M is smaller than N, and outputting the particular set of M symbols for transmission over a transmission medium. Other embodiments are also described.

19 Claims, 5 Drawing Sheets

(56) References Cited

U.S. PATENT DOCUMENTS

| | | |
|---|---|---|
| 2007/0177679 A1 | 8/2007 | Sovenyi |
| 2007/0241813 A1 | 10/2007 | Freeke |
| 2008/0136384 A1 | 6/2008 | Al-Shyoukh et al. |
| 2009/0010318 A1* | 1/2009 | Belogolovyi et al. ......... 375/222 |
| 2009/0206936 A1 | 8/2009 | Fernandez et al. |
| 2010/0148857 A1 | 6/2010 | Chellappa |
| 2010/0158043 A1 | 6/2010 | Bodo et al. |
| 2010/0260201 A1* | 10/2010 | Yu et al. ......................... 370/465 |
| 2010/0301899 A1 | 12/2010 | Vigoda et al. |
| 2010/0306164 A1 | 12/2010 | Reynolds et al. |
| 2011/0109389 A1 | 5/2011 | Beffa |
| 2012/0328049 A1* | 12/2012 | Felix ............................. 375/296 |

OTHER PUBLICATIONS

Zurcher Hochschule Winterthur, "Kapitel 5: Digitale Ubertragung im Basisband", pp. 14, retrieved from the Internet Apr. 3, 2014 at: https:jjhome.zhaw.ch;-rurjntm/unterlagenjntmkap53leicode.pdf (Jan. 2005).

Extended European Search Report for European Patent Appln. No. 12181718.3 (Apr. 24, 2014).

Telecommunications Industry Standards in People's Republic of China, "Technical Requirement of Physical Layer for Extended Reach Ethernet Basede on 2D-PAM3 and 4D-PAM5"; Released by PRC industry and Information Department, Jun. 15, 2009.

\* cited by examiner $Sd_n[6:8]$ 111    (-1,0,+1,0,1,-1)        (-1,-1,+1,+1,0,0)

DEVICE AND METHOD FOR ENCODING BITS TO SYMBOLS FOR A COMMUNICATION SYSTEM

When a stream of pulse amplitude modulate (PAM) signals is transmitted through a serial point-to-point communication medium with passive high pass filters in the form of transformers or any high pass filter, the received signal at a receiver will be DC free as the high pass filters attenuate the low frequency components of the PAM signal. If a stream of the PAM signals is not DC free, then the DC of the stream begins to shift towards either positive voltage or negative voltage from the nominal. This phenomenon is called baseline wander (BLW), which occurs normally due to the high pass nature of the network transformers or any form of high pass filter and the symbols used for data transmission without frequent positive and negative voltage transitions. When BLW occurs, the bit error rate (BER) performance of a system deteriorates. The most common solutions to improve the baseline wander phenomenon are: 1) compensating the BLW by regenerating the approximate DC value of the transmitted signal in the local receiver, 2) compensating the BLW by estimating an equivalent DC value of the transmitting signal in the local transmitter before sending a stream of PAM signals (this may not result effective since it is a feed forward approach), and 3) using a bit-to-symbol mapping technique with sufficient positive and negative voltage transitions of symbols at the transmitter.

For the first solution, conventional techniques use a baseline wander compensating unit, which is also called a baseline wander circuit, at a receiver that compensates for the change in DC level of the received signal. Using this solution, the compensation of the BLW is done effectively in the digital domain using a digital signal processing (DSP) algorithm. Thus, the use of a baseline wander circuit in a high speed serial communication system increases the cost in terms of silicon area and power consumption of the receiver circuit.

For the second solution, the approach is based on feed forward, and thus, it may not result as an effective solution.

For the third solution, conventional bit-to-symbol mapping techniques do provide sufficient positive and negative voltage transitions of symbols at the transmitter to increase the BER performance of the system. However, there is a need for a bit-to-symbol mapping technique to further increase the BER performance of a serial communication system.

A device and method for encoding bits to symbols for a communication system are described. In one embodiment, a method for encoding bits to symbols for a communication system includes receiving a set of N-bit data to be transmitted, where N is an integer, generating side scrambling values using a polynomial, scrambling the set of N-bit data using the side scrambling values to produce scrambled data, mapping the scrambled data to a particular set of M symbols from a plurality of sets of M symbols, where M is an integer and M is smaller than N, and outputting the particular set of M symbols for transmission over a transmission medium. Other embodiments are also described.

In an embodiment, a device for encoding bits to symbols for a communication system includes a side scrambler module configured to generate side scrambling values using a polynomial, a data scrambler module configured to scramble a set of N-bit data to be transmitted using the side scrambling values from the side scrambler module to produce scrambled data, where N is an integer, and a symbol generation module configured to map the scrambled data to a particular set of M symbols from a plurality of sets of M symbols, where M is an integer and M is smaller than N, the M symbols being symbols to be transmitted over a transmission medium.

In an embodiment, a method for encoding bits to symbols for a communication system includes concatenating one additional bit to a byte of data to be transmitted to produce a 9-bit data, generating nine scrambling values using a polynomial, scrambling the nine-bit data using the nine side scrambling values to produce a nine-bit scrambled data, mapping the nine-bit scrambled data to a particular set of six symbols from a plurality of sets of six symbols, and outputting the particular set of six symbols for transmission over a transmission medium.

Other aspects and advantages of embodiments of the present invention will become apparent from the following detailed description, taken in conjunction with the accompanying drawings, depicted by way of example of the principles of the invention.

FIG. 3 shows an example of a bits-to-symbols mapping table in accordance with an embodiment of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
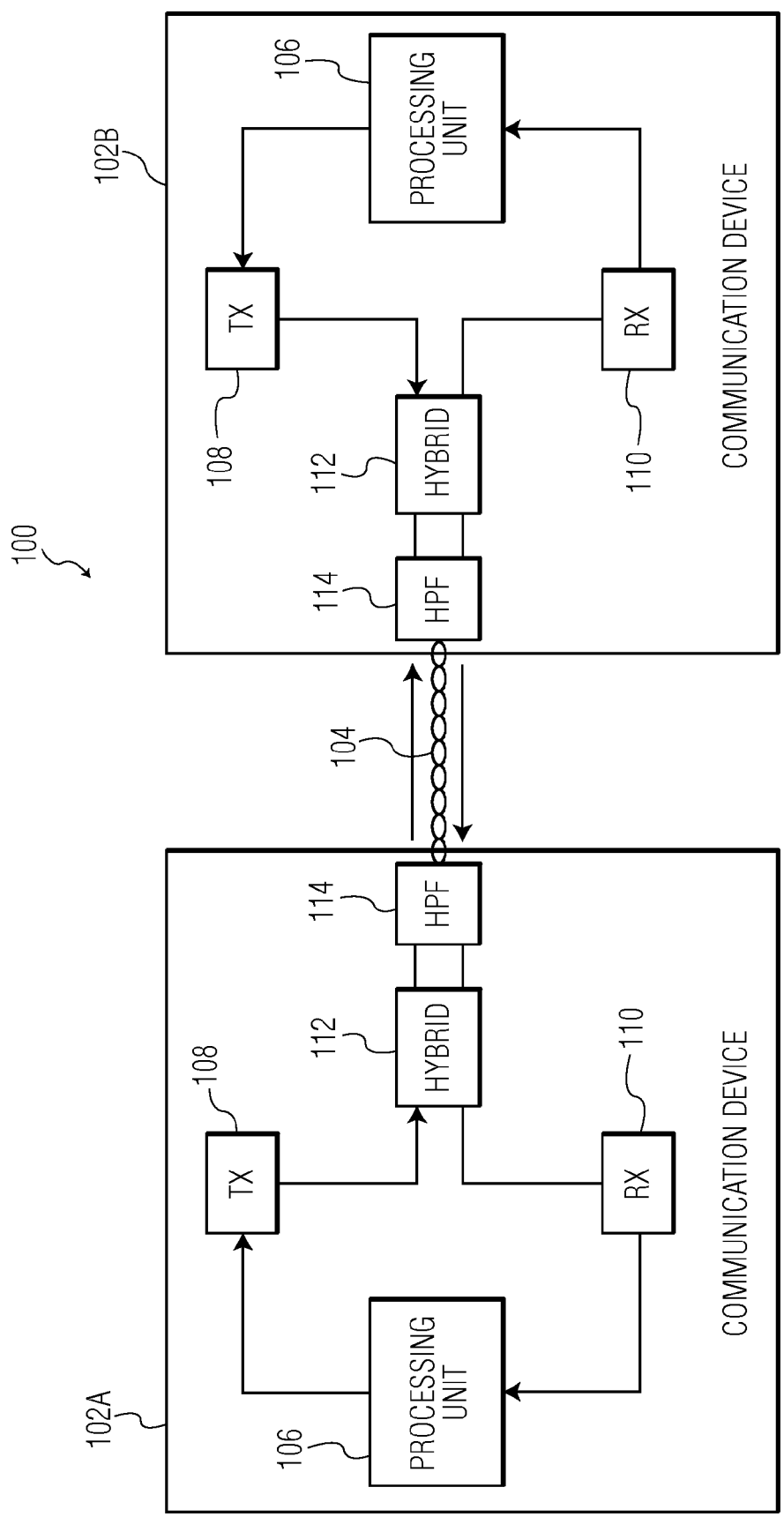
FIG. 1 is a schematic block diagram of a communication system in accordance with an embodiment of the invention.

FIG. 1 is a block diagram of a communication system 100 in accordance with an embodiment of the invention. The communication system includes a plurality of communication devices 102A and 102B that communicate with each other through one or more communication media 104. The communication devices could be a standalone device or a part of a big system, for example, a switch or router, where a device or a set of devices is embedded. In FIG. 1, the communication system is shown as including two communication devices. However, the communication system may include additional communication devices, which is directly connected to a shared communication medium or connected via a switch/router etc. Furthermore, in the illustrated embodiment, the communication system provides a serial point-to-point full duplex communication over a single unshielded twisted pair (UTP) cable between the communication devices. However, in other embodiments, the communication system may provide different types of wired or wireless communications between the communication devices. As described in more detail below, the communication devices utilize a bit-to-symbol encoding technique to provide sufficient positive and negative voltage transitions of symbols at transmission to increase the BER performance of the system.

The communication devices 102A and 102B are structurally and functionally similar to each other. Each of the communication devices is configured to transmit and receive data in the form of symbols, each of which can be one of three different values, positive one (+1), zero (0) or negative one (−1). Thus, the data to be transmitted between the communication devices are first mapped to different symbols before being transmitted over the transmission medium 104, which may be a UTP cable connected between the communication devices.

As illustrated in FIG. 1, each of the communication devices 102A and 102B includes a processing unit 106, a transmitter circuit 108, a receiver circuit 110, a hybrid circuit 112 and a high pass filter (HPF) 114. The processing unit is configured to generate outgoing data to be transmitted to other communication devices and to process incoming data from the other communication devices. The processing unit is also configured to execute one or more operations. The particular operations of the processing unit can vary depending on the application of the communication system 100. In some embodiments, the processing unit may include a processor that can perform at least some of the operations of the processing unit. The processor may be a general-purpose digital processor such as a microprocessor or microcontroller, a special-purpose processor such as a digital signal processor, a controller or a field programmable gate array (FPGA).

The transmitter circuit 108 is configured to receive outgoing data from the processing unit 106 and encode the outgoing data to symbols for transmission. The symbols to be transmitted are then sent to the hybrid circuit 112 for transmission over the transmission medium 104 via the high pass filter 114, which may be, for example, a transformer. The receiver circuit 110 is configured to receive incoming symbols from the transmission medium via the high pass filter and the hybrid circuit and decodes the symbols into the original transmitted data. The decoded data is then sent to the processing unit for processing.

The hybrid circuit 112 is configured to facilitate a full duplex communication through the transmission medium 104, which may be a UTP cable, via the high pass filter 114. When two transmitters are transmitting symbols through a UTP cable at the same time, the signal on the cable is summation of the two transmitted symbols. In this case, the hybrid circuit separates the transmitted signal from the received signal.

Figure 2:
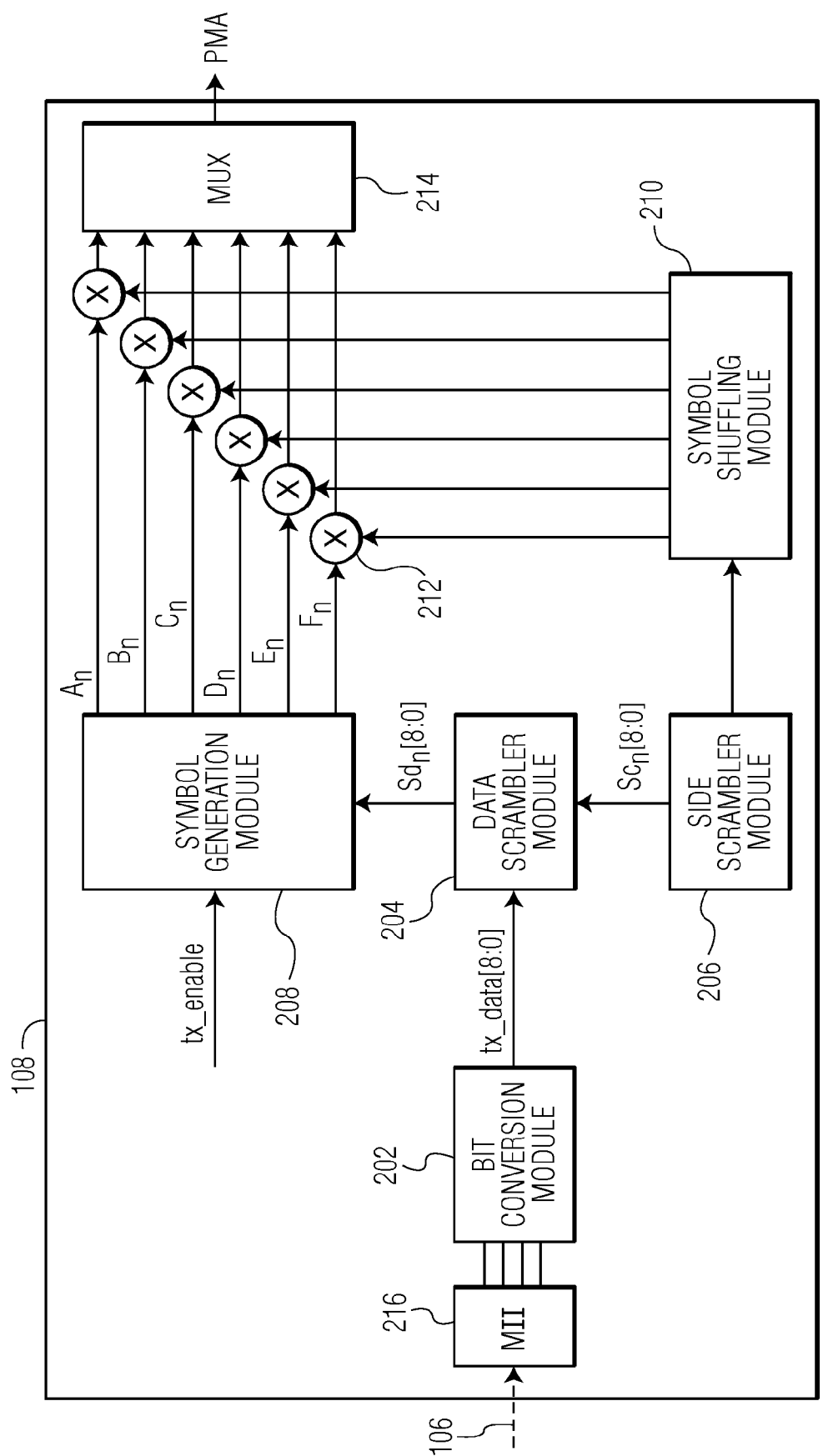
FIG. 2 is a block diagram of a transmitter of communication devices included in the communication system in accordance with an embodiment of the invention.

Turning now to FIG. 2, the transmitter circuit 108 of the communication devices 102A and 102B in accordance with an embodiment of the invention is shown. The transmitter circuit is designed to encode N-bit data to a set of M symbols, where N and M are integers such that M is smaller than N. The N-bit data includes the information to be transmitted, which is transmitted over the transmission medium 104 as the M symbols. The transmitter circuit includes a bit conversion module 202, a data scrambler module 204, a side scrambler module 206, a symbol generation module 208, a symbol shuffling module 210, multiplication units 212 and a multiplexer 214. Since these modules are part of the transmitter circuit, at least some of these modules include circuitry to perform their respective functions. The transmitter circuit may further include components commonly found in a transmitter that serially transmit signals over a UTP cable, such as an Ethernet transmitter circuit.

The bit conversion module 202 is configured to receive a set of data to be transmitted. In an embodiment, the set of data received by the bit conversion module is N-bit data, where N is eight. Thus, the set of data received by the bit conversion module is 8-bit data or a byte of data, which will be used to describe the operations of the components illustrated in FIG. 2. However, in other embodiments, the received set of data may be smaller or larger than a byte of data. In a particular implementation, the bit conversion module receives a byte of data from a media independence interface (MII) 216 on four parallel signal lines. In this implementation, the bit conversion module 202, the data scrambler module 204, the side scrambler module 206, the symbol generation module 208 and the symbol shuffling module 210 are part of the physical coding sublayer (PCS) of the physical layer (PHY) of the communication device 102A or 102B. The bit conversion module is further configured to concatenate an additional one bit to the most significant bit of the received byte of data to produce 9-bit concatenated data tx_data[8:0]. That is, the received byte of data is made into a 9-bit set of data tx_data [8:0] by adding the additional one bit to the received byte of data. The received byte of data is converted into three 3-bit data using the extra concatenated bit ($8^{th}$ bit of tx_data[8:0]). In one embodiment, the extra bit is a redundant bit that is concatenated to the MSB of the received byte of data in order to detect or correct the symbol error. In other embodiments, that extra bit can be the LSB of the next nibble (4-bit) from the MII or it can be any bit of the next received nibble from the MII. The resulting 9-bit data tx_data[8:0] is sent to the data scrambler module as an output of the bit conversion module. In these embodiments, the output of the bit conversion module is the received byte of data.

The data scrambler module 204 is configured to receive the 9-bit data tx_data[8:0] from the bit conversion module 202 and scrambles the 9-bit data using nine side scrambling output values $Sc_n[8:0]$ from the side scrambler module 206 to produce scrambled 9-bit data $Sd_n[8:0]$. As an example, the output values $Sc_n[8:0]$ of the side scrambler module can be expressed as (where the notation ^ means the XOR operation):

$Sc_n[8:7]=Sy_n[8:7];$ $Sc_n[6]=Sy_n[6];$ $Sc_n[5:4]=Sy_n[5:4];$ $Sc_n[3]=Sy_n[3];$ $Sc_n[2:1]=Sy_n[2:1];$ and $Sc_n[0]=Sy_n[0].$ The variable $Sy_n[8:0]$ can be calculated as:

$Sy_n[0]=Scr_n[0];$ $Sy_n[1]=Scr_n[3]\hat{}Scr_n[8],$ $Sy_n[2]=Scr_n[6]\hat{}Scr_n[16],$ $Sy_n[3]=Scr_{n-1}[0],$ $Sy_n[4]=Scr_{n-1}[3]\hat{}Scr_{n-1}[8],$ $Sy_n[5]=Scr_{n-1}[6]\hat{}Scr_{n-1}[16],$ $Sy_n[6]=Scr_{n-2}[0],$ $Sy_n[7]=Scr_{n-2}[3]\hat{}Scr_{n-2}[8],$ $Sy_n[8]=Scr_{n-2}[6]\hat{}Scr_{n-2}[16].$ Using the above expressions, the scrambled 9-bit data $Sd_n[8:0]$ produced by the data scrambler module 204 can be, for example, defined as:

$Sd_n[8]=Sc_n[8]\hat{}tx\_data[8];$ $Sd_n[7:6]=Sc_n[7:6];$ $Sdn[5]=Sc_n[5]\hat{}tx\_data[5];$ $Sd_n[4:3]=Sc_n[4:3];$ $Sd_n[2]=Sc_n[2]\hat{}tx\_data[2];$ and $Sd_n[1:0]=Sc_n[1:0]$ Using the $Scr_n[32:0]$ values, the expression $Sg_n[5:0]$ can be, for example, defined as:

$Sg_n[0]=Scr_{n[1]Scrn}[5];$ $Sg_n[1]=Scr_n[4]\hat{}Scr_n[8]\hat{}Scr_n[9]\hat{}Scr_n[13];$ $Sg_n[2]=Scr_n[7]\hat{}Scr_n[11]\hat{}Scr_n[17]\hat{}Scr_n[21];$ $Sg_n[3]=Scr_n[10]\hat{}Scr_n[14]\hat{}Scr_n[15]\hat{}Scr_n[19]\hat{}Scr_n[20]$
$\hat{}Scr_n[24]\hat{}Scr_n[25]\hat{}Scr_n[29];$ $Sg_n[4]=Scr_n[13]\hat{}Scr_n[16]\hat{}Scr_n[18]\hat{}Scr_n[23]\hat{}Scr_n[26]$
$\hat{}Scr_{n[27]Scrn}[30]\hat{}Scr_n[31];$ $Sg_n[5]=Scr_n[16]\hat{}Scr_n[21]\hat{}Scr_n[22]\hat{}Scr_n[24]\hat{}Scr_n[25]$
$\hat{}Scr_n[28]\hat{}Scr_n[29]\hat{}Scr_n[32]$ The side scrambler module 206 is a logic circuit that generates a stream of side scrambling values. In an embodiment, the side scrambler module is implemented as a linear feedback shift register (LFSR) with 33 delay elements. When the transmitter circuit is operating as a master device, the master scrambler polynomial used by the side scrambler module maybe $g_m(x)=1+x^{13}+x^{33}$ to generate the $Scr_n[32:0]$ values. When the transmitter circuit is operating as a slave device, the slave scrambler polynomial used by the side scrambler module maybe $g_s(x)=1+x^{20}+x^{33}$ to generate the $Scr_n[32:0]$ values.

The symbol generation module 208 is configured to receive the scrambled 9-bit data $Sd_n[8:0]$ and map the received 9-bit data to a set of six symbols $A_n$, $B_n$, $C_n$, $D_n$, $E_n$ and $F_n$ using a bits-to-symbols mapping table, which may be stored in the symbol generation module or in a storage memory device (not shown) accessible by the symbol generation module. An example of such bits-to-symbol mapping table is shown in FIG. 3. The bits-to-symbol mapping table can have at maximum 512 entries, where each entry has six symbols and each symbol can take one of three different values, a positive one (+1), a zero (0) or a negative one (−1). Since there are 729 ($3^6$) possible symbols and only 512 ($2^9$) possible 9-bit data, there is some freedom to choose the 512 symbols out of the 729 possible symbols. Thus, the 512 symbols can be chosen so that the DC characteristics of the stream of symbols will be as close to zero as possible, and the Euclidean distance between the symbols is sufficiently large to maintain a required BER performance. The output of the symbol generation module is sent to the multiplication units 212 so that each of the six symbols is transmitted to one of the multiplication units. In the illustrated embodiment, the symbol generation module maps the received 9-bit data to a set of six symbols in response to a transmit enable signal tx_enable, which may be from the processing unit 106.

The symbol shuffling module 210 is configured to receive state information from the side scrambler module 206 and transmit the state information to the multiplication units 212 to perform symbol polarity shuffling. In an embodiment, the symbol shuffling module transmits either a −1 value or a +1 value to the individual multiplication units as a function of the states of the side scrambler module to change the polarity of the symbols from the symbol generation module 208. The initial states of the side scrambler module can be chosen to be any, except all zeros. Each of the multiplication units thus multiplies the received symbol from the symbol generator module by either a −1 value or a +1 value, thereby shuffling the polarity of the six symbols generated by the symbol generator module. The resulting set of six symbols is then sent to the hybrid circuit 112 (shown in FIG. 1) for transmission. In a particular implementation, the resulting symbols are sent to the demultiplexer 214, which is a 6:1 demultiplexer in the illustrated embodiment, to be serially transmitted over a single UTP cable, such as the UTP cable 104 shown in FIG. 1, via a physical medium attachment (PMA).

In order to decode symbols transmitted over the UTP cable 104, the receiver 110 of the communication devices 102A and 102B includes components necessary to perform a decoding process, which is essentially the reverse of the encoding process. Thus, the components of the receiver will need to demultiplex (1:6) the received symbols to produce a set of six symbols, deshuffle the set of six symbols, convert the six deshuffled symbols into 9-bit scrambled data, descramble the 9-bit scrambled data, and convert the 9-bit data into 4-bits of data. In order to perform symbol deshuffling and bit scrambling, the receiver will need to produce side scrambler values, similar to the side scrambler values in the transmitter, to perform these operations. The bits-to-symbols encoding technique described above in accordance with one embodiment of the invention has advantages over conventional bits-to-symbols encoding technique. As an example, when compared to a bits-to-symbols technique described in U.S. Pat. No. 7,835,389, assigned to Broadcom Corporation, the bits-to-symbols encoding technique described herein has improved DC characteristics and more simple BLW. That is, the DC of the transmitted stream of the PAM signals does not change (or may change significantly less) when the stream is received at the receiver such that a baseline wander circuit is not needed at the receiver or its complexity will be less compared to the Broadcom solution.

Figure 4:
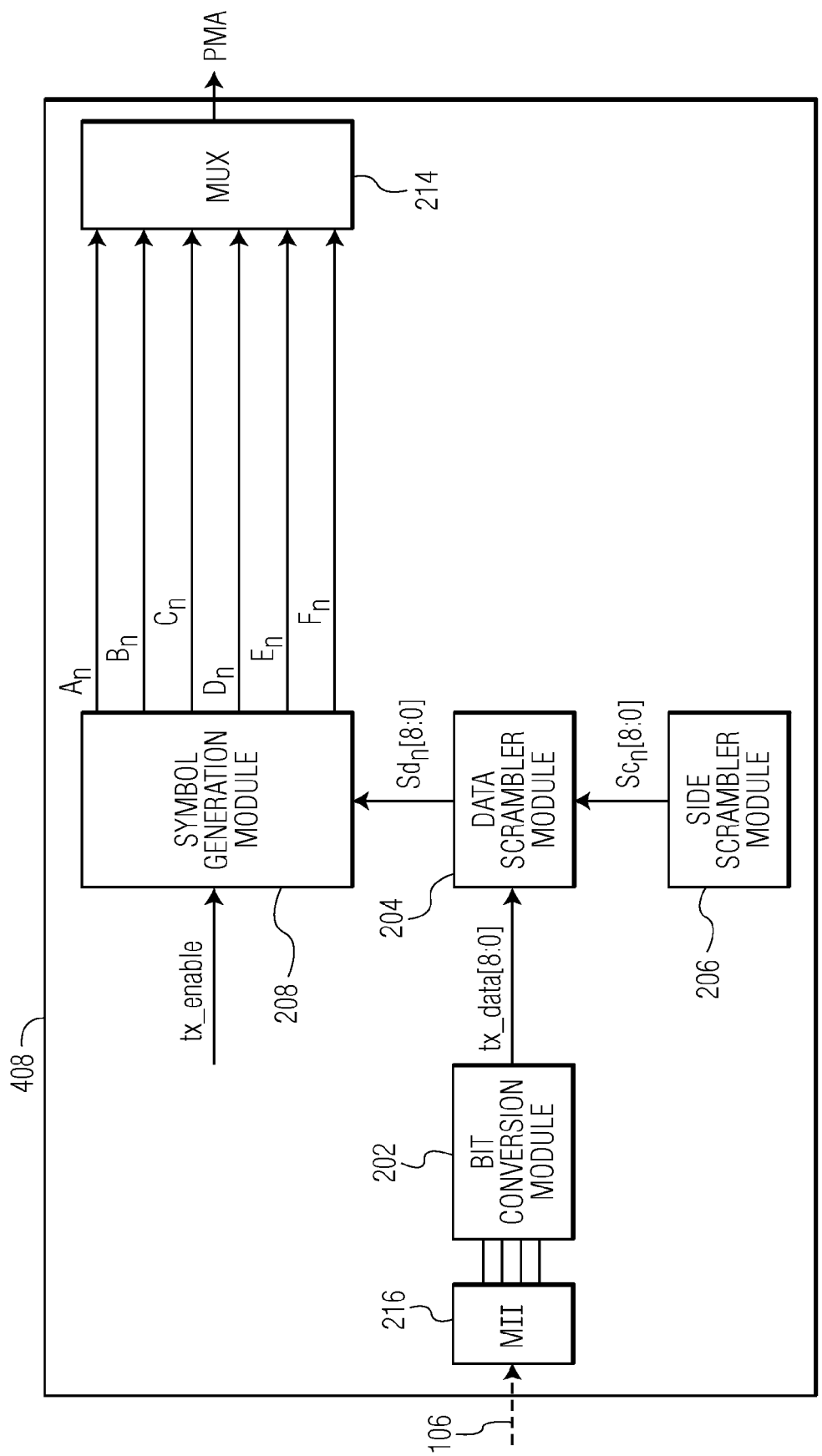
FIG. 4 is a block diagram of a transmitter of communication devices included in the communication system in accordance with an alternative embodiment of the invention.

Turning now to FIG. 4, a transmitter circuit 408 in accordance with an alternative embodiment of the invention, which can be used in the communication devices 102A and 102B, is shown. Similar to the transmitter circuit 108 shown in FIG. 2, the transmitter circuit 408 shown in FIG. 4 is configured to encode an N-bit data to a set of M symbols, where N and M are integers such that M is smaller than N. However, the transmitter circuit 408 does not perform a symbol shuffling operation. Thus, the transmitter circuit 408 includes the MII 216, the concatenation module 202, the data scrambler module 204, the side scrambler module 206 and the symbol generation module 208, but does not include the symbol reshuffling module 210 and the multiplication units 212.

The transmitter circuit 408 operates in the same manner as the transmitter circuit 108 shown in FIG. 2 to produce a set of M symbols using a bits-to-symbols mapping table such as the table shown in FIG. 3, which may be stored in the symbol generation module 208 or in a storage memory device (not shown) accessible by the symbol generation module. The operation of the transmitter circuit 408 will again be described using a particular implementation in which a byte of data is encoded to a set of six symbols. The bit conversion module 202 receives a byte of data, e.g., on four parallel signal lines from the MII 216, concatenates an additional one bit to the byte of data and outputs the resulting 9-bit data tx_data[8:0]. The data scrambler module 204 then receives the 9-bit data tx_data[8:0] from the bit conversion module and scramble the 9-bit data using nine scrambling output values $Sc_n[8:0]$ from the side scrambler module 206 to produce scrambled 9-bit data $Sd_n[8:0]$. The symbol generation module 208 then receives the scrambled 9-bit data $Sd_n[8:0]$ and maps the received 9-bit data to a set of six symbols using the bits-to-symbols table. The resulting set of six symbols is then sent to the hybrid circuit 112 for transmission.

Since symbols are not shuffled in this alternative embodiment, the symbols will not need to be deshuffled when received at a receiver. Consequently, in this alternative embodiment, the receiver 110 of the communication devices 102A and 102B includes components necessary to perform a decoding process without reshuffling. Thus, the components of the receiver will need to demultiplex (1:6) the received symbols to produce a set of six symbols, convert the six symbols into 9-bit scrambled data, descramble the 9-bit scrambled data, and convert the remaining byte of data into 4-bits of data.

The bits-to-symbols encoding technique described above in accordance with the alternative embodiment of the invention will significantly reduce the circuit components necessary to implement the transmitter. However, this alternative bits-to-symbols encoding technique may result in less simple BLW and degrade DC characteristics.

Figure 5:
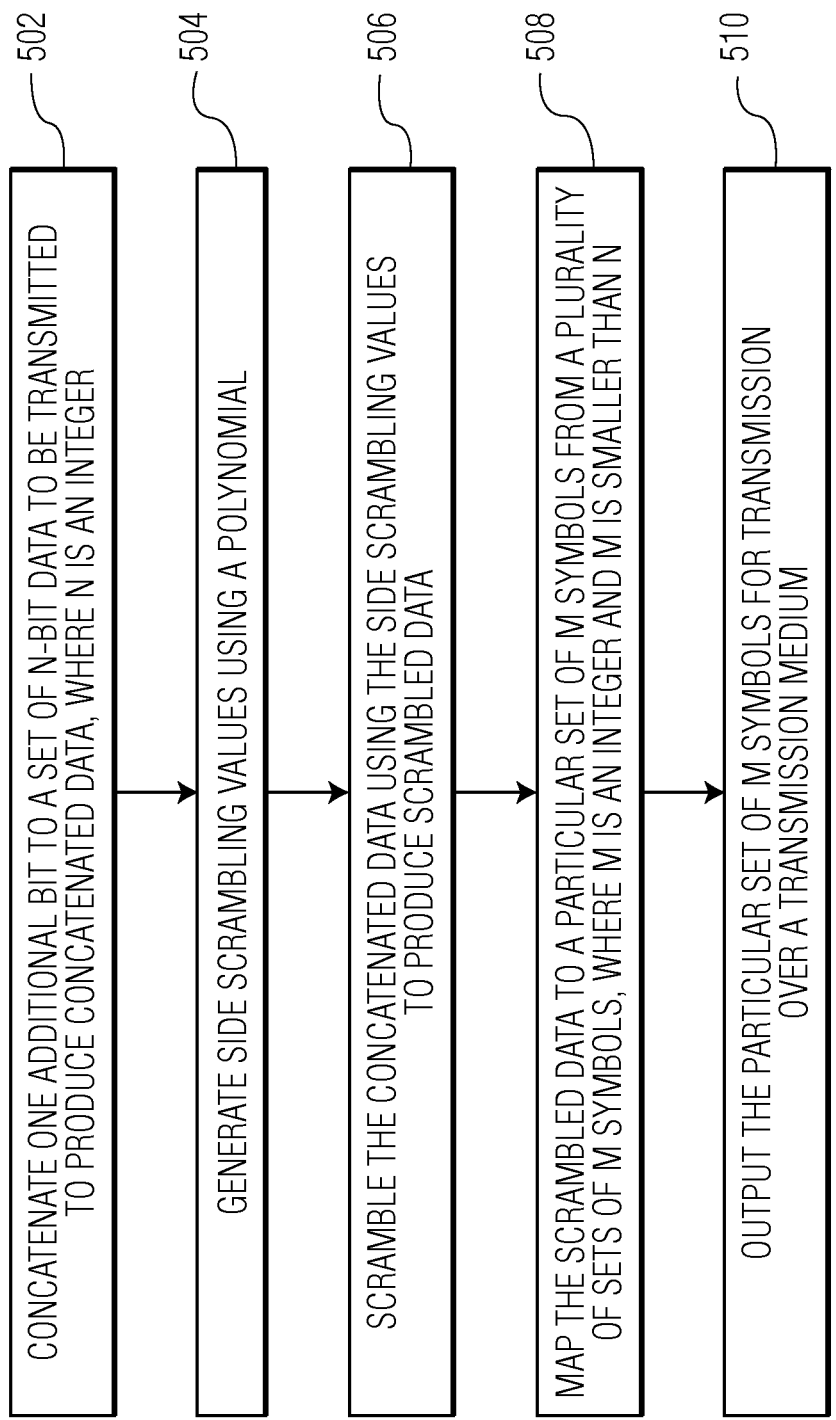
FIG. 5 is a process flow diagram of a method for encoding bits to symbols for a communication system in accordance with an embodiment of the invention.

FIG. 5 is a process flow diagram of a method for encoding bits to symbols for a communication system in accordance with an embodiment of the invention. At block 502, one additional bit is concatenated to a set of N-bit data to be transmitted to produce concatenated data, where N is an integer. At block 504, side scrambling values are generated using a polynomial. At block 506, the concatenated data is scrambled using the side scrambling values to produce scrambled data. At block 508, the scrambled data is mapped to a particular set of M symbols from a plurality of sets of M symbols, where M is an integer and M is smaller than N. At block 510, the particular set of M symbols is output for transmission over a transmission medium.

The various components or units of the embodiments that have been described or depicted may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments that have been described or depicted may be implemented in a processor, which may include a multifunction processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for encoding bits to symbols for a communication system, the method comprising:
    concatenating an error correction bit to the most significant bit of a set of data to generate a set of N-bit data to be transmitted, where N is an integer;
    generating side scrambling values using a polynomial;
    scrambling the set of N-bit data using the side scrambling values to produce scrambled data;
    mapping the scrambled data to generate a particular set of M symbols from a plurality of sets of M symbols, where M is an integer and M is smaller than N; and
    outputting the particular set of M symbols for transmission over a transmission medium.

2. The method of claim 1, wherein said N is eight.

3. The method of claim 1, wherein said M is six, and wherein the mapping includes mapping the scrambled data to a particular set of six symbols from a plurality of sets of six symbols.

4. The method of claim 1, wherein said generating includes generating the side scrambling values using a polynomial of $g_m(x)=1+x^{13}+x^{33}$ or $g_s(x)=1+x^{20}+x^{33}$, where $g_m(x)$ is a master scrambler and gs(x) is a slave scrambler polynomial.

5. The method of claim 1, further comprising shuffling the polarity of the particular set of M symbols using states of the side scrambling values.

6. The method of claim 1, further comprising multiplexing the M symbols to a single output line so that the M symbols can be serially transmitted over the transmission medium.

7. The method of claim 5, wherein the transmission medium includes an unshielded twisted pair (UTP) cable.

8. The method of claim 1, further comprising receiving the set of N-bit data on four parallel signal lines from a media independence interface (MII) before the concatenating of the error correction bit to the set of data.

9. A device comprising:
   a bit conversion module configured to concatenate an error correction bit to the most significant bit of a set of data to generate a set of N-bit data to be transmitted, where N is an integer;
   a side scrambler module configured to generate side scrambling values using a polynomial;
   a data scrambler module configured to scramble the set of N-bit data to be transmitted using the side scrambling values from the side scrambler module to produce scrambled data; and
   a symbol generation module configured to map the scrambled data to a particular set of M symbols from a plurality of sets of M symbols, where M is an integer and M is smaller than N,
   the particular set of M symbols being symbols to be transmitted over a transmission medium.

10. The device of claim 9, wherein said N is eight, and wherein the data scrambler module is configured to scramble a set of eight-bit data to be transmitted.

11. The device of claim 9, wherein said M is six, and wherein the symbol generation module is configured to map the scrambled data to a particular set of six symbols from a plurality of sets of six symbols.

12. The device of claim 9, wherein the side scrambler module is configured to generate the side scrambling values using a polynomial of $g_m(x)=1+x^{13}+x^{33}$ or $g_s(x)=1+x^{20}+x^{33}$, where $g_m(x)$ is a master scrambler and $gs(x)$ is a slave scrambler polynomial.

13. The device of claim 9, further comprising a symbol shuffling module configured to output values using states of the side scrambling values for symbol polarity shuffling.

14. The device of claim 9, further comprising a multiplexer configured to multiplex the M symbols to a single output line so that the M symbols can be serially transmitted over the transmission medium.

15. The device of claim 9, wherein the transmission medium includes an unshielded twisted pair (UTP) cable.

16. A method for encoding bits to symbols for a communication system, the method comprising:
   concatenating an error correction bit to the most significant bit of a byte of data to be transmitted to produce a nine-bit data;
   generating nine scrambling values using a polynomial;
   scrambling the nine-bit data using the nine side scrambling values to produce a nine-bit scrambled data;
   mapping the nine-bit scrambled data to generate a particular set of six symbols from a plurality of sets of six symbols; and
   outputting the particular set of six symbols for transmission over a transmission medium.

17. The method of claim 16, further comprising multiplexing the particular set of six symbols to a single output line so that the particular set of six symbols can be serially transmitted over the transmission medium.

18. The method of claim 16, further comprising shuffling the polarity of the particular set of six symbols using states of the side scrambling values.

19. The method of claim 1, wherein generating the side scrambling values comprises generating the side scrambling values using a linear feedback shift register (LFSR).

\* \* \* \* \*